United States Patent
Walton et al.

(10) Patent No.: US 7,586,644 B2
(45) Date of Patent: Sep. 8, 2009

(54) COLOR CONVERSION SYSTEM AND METHOD

(75) Inventors: Derek T. Walton, Bolton, MA (US); John J. Koger, Newton Center, MA (US)

(73) Assignee: Conexant Systems, Inc., Newport Beach, CA (US)

(*) Notice: Subject to any disclaimer, the term of this patent is extended or adjusted under 35 U.S.C. 154(b) by 366 days.

(21) Appl. No.: 11/512,905

(22) Filed: Aug. 30, 2006

(65) Prior Publication Data

US 2007/0188814 A1    Aug. 16, 2007

Related U.S. Application Data

(60) Provisional application No. 60/773,521, filed on Feb. 15, 2006.

(51) Int. Cl.
G06F 15/00 (2006.01)
(52) U.S. Cl. .............................. 358/1.9; 358/518
(58) Field of Classification Search ............... 358/518, 358/1.9
See application file for complete search history.

(56) References Cited

U.S. PATENT DOCUMENTS

| | | | |
|---|---|---|---|
| 6,020,978 A | 2/2000 | Cooper et al. | |
| 6,204,934 B1 | 3/2001 | Minamino | |
| 6,404,508 B1 | 6/2002 | Ota et al. | |
| 6,525,838 B1 | 2/2003 | Nagae et al. | |
| 6,714,320 B1 | 3/2004 | Nakahara et al. | |
| 6,731,400 B1 * | 5/2004 | Nakamura et al. | 358/1.9 |
| 6,753,988 B1 | 6/2004 | Eldredge | |
| 6,795,215 B1 | 9/2004 | Silverbrook et al. | |
| 6,829,063 B1 | 12/2004 | Allebach et al. | |
| 6,879,416 B2 * | 4/2005 | Shimizu | 358/520 |
| 6,924,819 B2 | 8/2005 | Nishida et al. | |
| 6,924,908 B1 | 8/2005 | Kimia | |
| 6,930,808 B2 | 8/2005 | Otani | |
| 6,931,163 B1 * | 8/2005 | Wechgeln | 382/293 |
| 7,006,105 B2 | 2/2006 | Deishi et al. | |
| 7,009,729 B2 | 3/2006 | Fujita | |
| 7,123,538 B2 * | 10/2006 | Yamauchi et al. | 365/230.03 |

(Continued)

OTHER PUBLICATIONS

International Color Consortium, "Color Management—Conceptual Overview, Evolution, Structure & Color Rendering Options", 29 pages.

(Continued)

*Primary Examiner*—Twyler L. Haskins
*Assistant Examiner*—Michael Burleson
(74) *Attorney, Agent, or Firm*—John R. Thompson; Stoel Rives LLP

(57) ABSTRACT

A processor is provided that includes a primary memory of a processor and color conversion logic. The primary memory is to store a first color look-up table (LUT) related to a second color space. The color conversion logic is responsive to a received set of pixels, where each pixel of the set of pixels includes a color value in a first color space. The color conversion logic includes decision logic to selectively access the first color LUT and a second color LUT of a secondary memory to obtain a color value of the second color space that is associated with each pixel of the set of pixels based on a comparison of each pixel to at least one neighboring pixel.

22 Claims, 5 Drawing Sheets

U.S. PATENT DOCUMENTS 7,199,897 B2 * 4/2007 Nomizu ..................... 358/1.18
2004/0234135 A1 * 11/2004 Nomizu ..................... 382/209

OTHER PUBLICATIONS

Jonathan Sachs, "Digital Image Basics", 14 pages.

Michael Stokes, "A Standard Default Color Space for the Internet: sRGB", International Color Consortium, Apr. 25, 2006, 11 pages.

Norman Koren, "Making Fine Prints in Your Digital Darkroom; Light and Color: an Introduction", Norman Koren Photography, Apr. 25, 2006, 8 pages.

* cited by examiner

COLOR CONVERSION SYSTEM AND METHOD

CROSS-REFERENCE TO RELATED APPLICATION(S)

This application is a non-provisional application that claims priority from U.S. Provisional Patent Application No. 60/773,521, filed on Feb. 15, 2006 and entitled "COLOR CONVERSION SYSTEM AND METHOD," which is incorporated herein by reference in its entirety.

FIELD OF THE DISCLOSURE

The present disclosure generally relates to color data conversion and more particularly to devices and methods for converting color data between color spaces.

BACKGROUND

Generally, digital images are composed of pixels (picture elements). Each pixel represents a color (or a gray level for black and white images) at a single point in the image. A pixel is typically stored within a memory of a system according to its red, green, and blue (RGB) levels.

In general, colors may be combined in two different ways: additive color mixing and subtractive color mixing. Subtractive color mixing describes how two color inks combine on a surface to form a different color. The three subtractive primary colors are Cyan (blue-green), Magenta (purple-red), and Yellow. Color printers typically utilize a subtractive color model and use cyan, magenta and yellow inks to produce color images. Additionally, black ink is often used to compensate for the impure color in the inks, resulting in a cyan, magenta, yellow and black (CMYK) color model. Color printers may also use additional inks (for instance, light cyan ink, light magenta ink, and the like) to improve certain characteristics of the output image. Display devices, such as computer monitors, typically utilize the additive color model, where the image is formed on the face of the monitor by combining beams of red, green and blue (RGB) light in different proportions.

In many printing systems, an image to be printed is delivered by a computing system in an RGB color space rather than in the CMYK color space that is native to the printing system. In this situation, the printing device maps the image from the input RGB color space to the printer's CMYK color space prior to printing. The process of mapping from one color space to another is known as color space conversion.

Typically, printing systems perform color space conversions using a technique that is based on a 3-dimensional (3-D) color look-up table (LUT). With this technique, a 3-D LUT is constructed that contains the desired CMYK output values for the combinations of RGB input values. Using the 3-D LUT, each pixel of the input RGB image is converted to the CMYK color space by selecting the CMYK output value from the location within the 3-D LUT corresponding to the input RGB value.

In practice, it is not necessary to employ a 3-D LUT that maps all possible combinations for the input values of red, green and blue. Instead, many systems utilize a 3-D LUT that includes CMYK color space values only for a subset of the possible input RGB color combinations. By utilizing a 3-D LUT that includes CMYK values for only a subset of the RGB color combinations, inaccuracies may be introduced in the color space conversion process. When using a subset 3-D LUT, certain combinations of input RGB values are simply not available within the LUT. One approach for handling such unmapped RGB combinations is to select an output CMYK value within the LUT that corresponds to an RGB combination that is closest to the unmapped RGB combination. Another approach for handling such unmapped RGB values utilizes interpolation to derive the output CMYK value from a set of CMYK values within a LUT, where the set of CMYK values corresponds to RGB combinations that closely match the unmapped RGB combination.

A subset 3-D LUT may be described in terms of the number of sample points for each of the red, green, and blue input values. A 17×17×17 table, for instance, is based on input RGB sample points corresponding to 17 levels of red, 17 levels of green, and 17 levels of blue. A 17×17×17 3-D LUT thus contains output CMYK values for 4913 (17×17×17=4913) different input RGB combinations. Printing systems commonly utilize subset 3-D LUTs of size 17×17×17 or 9×9×9. A 17×17×17 3-D LUT is said to be larger than a 9×9×9 3-D LUT because it maps a larger number of input RGB combinations.

The number of RGB color combinations mapped by a subset 3-D LUT is an important design element in a color space conversion system. The size of the 3-D LUT directly affects the color reproduction accuracy. Larger 3-D LUTs provide better color accuracy because a larger fraction of RGB color combinations can be mapped natively by the 3-D LUT. Thus, from a color accuracy point of view, larger 3-D LUTs may be preferred.

However, the size of the 3-D LUT may also impact system cost and performance. Smaller 3-D LUTs require less memory for storage and thus may offer a cost advantage over larger 3-D LUTs, both in terms of the real estate of the integrated circuit substrate and in terms of the production costs. Smaller 3-D LUTs may also offer a performance advantage. In some cases, a small 3-D LUT can be located on the same chip as the color space conversion computation engine (such as an image processor) itself, which may yield a performance advantage. Thus, from a perspective of cost and speed, a smaller 3-D LUT may be preferred.

Accordingly, there is a need for an improved color conversion system and method, which combines the color accuracy of large 3-D LUTs with the cost and performance efficiencies of small 3-D LUTs.

DETAILED DESCRIPTION OF THE DRAWINGS

Figure 1:
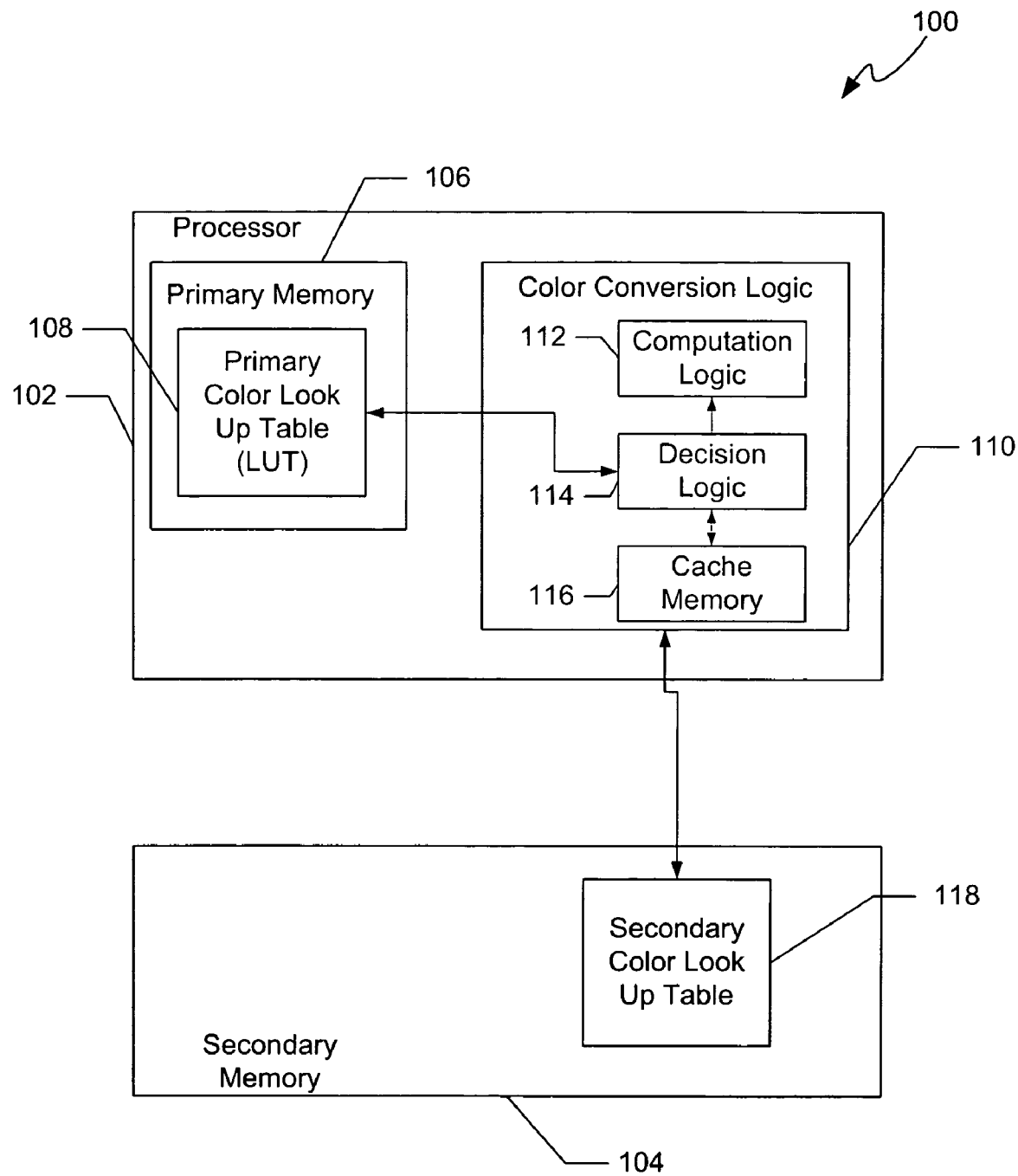
FIG. 1 is a block diagram of a particular embodiment of a representative system for color conversion including an on-chip color table and an off-chip color table.

In a particular illustrative embodiment, a processor is provided that includes a primary memory and color conversion logic. The primary memory is to store a first color look-up table (LUT) related to a second color space. The color conversion logic receives a set of pixels, where each pixel of the set of pixels includes a color value in a first color space. The color conversion logic includes decision logic to selectively access at least one of the first color LUT related to the second color space and a second color LUT of a secondary memory to obtain a color value of the second color space. The color value is associated with each pixel of the set of pixels based on a comparison of each pixel to at least one neighboring pixel.

In another particular illustrative embodiment, a method is provided that includes receiving a set of pixels in a first color space, computing a difference value between a selected pixel of the set of pixels and a neighboring pixel (e.g. a pixel that neighbors the selected pixel within the set of pixels) and selectively accessing, for each pixel, a first color look-up table (LUT) in a second color space or a second color LUT in the second color space to obtain a color value associated with the selected pixel. Each pixel of the set of pixels has a color value in a first color space. The first and second color LUTs are selectively accessed based on a comparison of the difference to a threshold. In a particular embodiment, if the second color LUT does not include a color match for a given pixel color, a color value may be interpolated from a set of color values in the second color space that correspond to color value combinations in the first color space that closely match the unmapped color value.

It should be understood that the term color value, as used herein, is intended to include color values of the particular color space for a given pixel. For example, a pixel in an RGB color space has an RGB color value that includes a red color value, a green color value, and a blue color value. A CYMK color value includes four values in the CYMK color space. In a particular embodiment, color conversion may be performed by looking up a color value for a given pixel in a color look up table, that includes a mapping for each color value in a first color space to a second color space. In an alternative embodiment, color conversion may be performed by retrieving color values from the color look up table that correspond to color values in the first color space that are approximately similar to the color value of the given pixel and then interpolating a color value for the given pixel in the second color space based on the retrieved color values. In some instances, an approximately similar color value may not match the color value of the given pixel. For example, within an RGB color space, the approximately similar color value may include a red color value, a green color value, and a blue color value, which do not match the red, green and blue values of the given pixel.

FIG. 1 is a block diagram of a particular illustrative embodiment of a representative system 100 for color conversion including an on-chip color table and an off-chip color table. The system 100 is adapted to convert colors of pixels of an image from a first color space (such as red-green-blue) to a second color space (such as cyan-magenta-yellow-black). The system 100 utilizes color look up tables (such as on-chip and off-chip color look up tables) to look up color values in a second color space that correspond to color values in a first color space for each pixel. When the pixel color does not map directly to a color conversion value in the look up table, the system 100 may obtain a set of color values in the second color space that closely match the unmapped pixel color and may compute the pixel value in the second color space by interpolating the pixel color value from the set of color values. In general, the color look up table (LUT) is a table of color values that may be used to associate color values between two color spaces. A table that converts from RGB to CMYK is a three-dimensional table (e.g. the RGB-to-CMYK table is indexed by the 3 components of the input RGB color space). Each element in the RGB-to-CMYK table has 4 output components (one for each of the CMYK color values). A table that converts from CMYK to RGB is a four dimensional table (e.g. the CMYK-to-RGB table is indexed by the 4 components of the input CMYK color space). Each element in the CMYK-to-RGB color table has 3 output components (one for each of the RGB color values).

The system 100 includes a processor 102 and a secondary memory 104, which may be external to the processor 102. The processor 102 includes a primary memory 106, including a primary color look-up table (LUT) 108, and color conversion logic 110. The color conversion logic 110 may include computational logic 112, decision logic 114, and an on-chip cache memory 116. The secondary memory 104 may include an external (secondary) color LUT 118. In general, the decision logic 114 is coupled to the primary memory 106 and to the secondary memory 104. The primary memory 106 includes a primary color LUT 108 that is related to a second color space. The primary color LUT 108 may be derived from a secondary color LUT 118, which may be stored off-chip in the secondary memory 104. In one particular embodiment, the first color LUT 108 and the second color LUT 118 contain color values in the second color space and are programmed with the same color conversion table sampled at different rates. In one particular embodiment, a first color space includes a set of red-blue-green (RGB) color values and a second color space includes a set of cyan-magenta-yellow-black (CMYK) color values, and the processor 102 is adapted to convert color values of a set of pixels in the first color space to color values in the second color space.

In operation, the color conversion logic 110 of the processor 102 receives a set of pixels, which may be associated, for example, with a color image. Each pixel of the received set of pixels has a color value in a first color space, which may be represented, for example, by a red value, a green value, and a blue value in an RGB color space. The color conversion logic 110 includes decision logic 114 to compare neighboring pixels of the set of pixels and to selectively access the first color LUT 108 in the primary memory 106 or the secondary color LUT 118 in the secondary memory 104 to obtain a color value in the second color space for each pixel of the set of pixels.

For example, for each pixel of the set of pixels, the color conversion logic 110 may utilize the computation logic 112 to compute a difference between a selected pixel and a previously selected pixel, a neighbor pixel within the set of pixels, or any combination thereof. The decision logic 112 may then compare the difference to a threshold to determine whether to access the primary color LUT 108 or the secondary color LUT 118 to obtain a set of color values in the second color space from which to compute the color value in the second color space for each pixel. In a particular embodiment, a given pixel may be converted from the first color space to the second color space (e.g. from an RGB color space to a CMYK color space) by replacing the color value of the pixel with one of the set of obtained color values. In another embodiment, the computation logic 112 may perform an interpolation to convert the color value of the pixel to an approximate value in the second color space based on the set of obtained values.

In one particular embodiment, the color conversion logic 110 accesses the secondary LUT 118 via the cache memory 116, which stores a set of color values obtained from the second color LUT 118 when the second color LUT 118 is accessed. The decision logic 114 may selectively access the primary color LUT 108, the secondary color LUT 118, or the cache memory 116 to obtain the desired color value.

In one particular embodiment, the decision logic 114 selectively accesses the second color LUT 118 when a color value difference between a selected pixel and a neighboring pixel is less than a threshold. In one embodiment, the threshold value may be defined by printer driver software based on a desired print quality level. In another embodiment, the threshold may be fixed in a read only memory. In yet another particular embodiment, the threshold may vary over time. In still another embodiment, the color conversion logic 110 may monitor on-chip versus off-chip accesses and may adjust the threshold to tune a performance parameter of the color conversion logic 110. In one particular embodiment, the performance parameter is a ratio of on-chip (to a primary memory 106 or a cache memory 116) versus off-chip (to a secondary memory 104) accesses. Alternatively, the performance parameter may be a processing speed. In yet another particular embodiment, the threshold may vary based on a history of on-chip versus off-chip accesses. The decision logic 114 may adjust the threshold to bias the decision logic 114 toward on-chip access when recent history includes a large number of off-chip accesses or to bias the decision logic 114 toward off-chip accesses when recent history includes a large number of on-chip accesses. In this instance, the decision logic 114 may adjust the threshold to maintain a relatively constant performance by tuning the on-chip and off-chip memory accesses.

In one particular embodiment, the primary memory 106 and the color conversion logic 110 are fabricated on an integrated circuit. In one particular embodiment, an access time of the primary memory 106 is less than an access time of the secondary memory 104. In yet another embodiment, the primary memory 106 is located on a first device, such as the processor 102, which includes the decision logic 114, and the secondary memory 104 is located on a second device that is coupled to the first device.

In general, during the color conversion process, the decision logic 114 selectively accesses the primary color LUT 108, the on-chip cache memory 116, or the secondary color LUT 118 to determine the color values for each pixel in the second color space. The decision logic 114 is adapted to obtain color values in the second color space for a given pixel in the first color space. The decision logic 114 balances a tradeoff between a desired visual quality and performance considerations of the color conversion logic.

For example, in a particular embodiment, the primary color LUT 108 may be a 9×9×9 3-dimensional (3-D) color LUT, while the secondary color LUT 118 may be a 17×17×17 3-D color LUT. In this instance, the primary color LUT 108 may include a sub-set of color values in the second color space, while the secondary color LUT 118 may include a larger sub-set or an entire table of color values in the second color space. Thus, the primary color LUT 108 includes fewer color values (e.g. is sampled at a lower rate) than the secondary color LUT 118. When a difference between a given pixel and at least one neighboring pixel is greater than a threshold, a color inaccuracy in the conversion may not be perceptible, so the decision logic 114 may access the primary color LUT 108 to retrieve the color values. Since the primary color LUT 108 is on-chip, the access time to the primary color LUT 108 is relatively fast, as compared to off-chip accesses. If the difference is less than the threshold, the decision logic 114 may access the secondary color LUT 118 or the cache memory 116, since the smaller difference represents a subtle change in color values from one pixel to a neighboring pixel that may be perceptible if a conversion-related inaccuracy is introduced.

The processor 102 may store a set of color values in the on-chip cache memory 116 corresponding to color conversion values retrieved from the secondary LUT 118 by the decision logic 114. Before accessing the secondary LUT 118 in the secondary memory 104, the decision logic 114 may check the on-chip cache memory 116. In a given image that involves slight or subtle color changes over a number of pixels, the on-chip cache memory 116 may contain color conversion data from a previous access of the secondary color LUT 118, and the decision logic 114 may be able to utilize the data from the on-chip cache memory 116, instead of retrieving the color values from the secondary color LUT 118 that is off-chip.

In a particular embodiment, the decision logic 114 may be adapted to select between the primary color LUT 108 and the secondary color LUT 118 based on a rate of change of the input values from one pixel of an image to the next pixel. For input values that demonstrate a large pixel-to-pixel color change, the primary color LUT 108 may be accessed. On the other hand, for input values that change slowly from one pixel to the next, the more precise secondary color LUT 118 may be used. By selecting between the primary color LUT 108 and the secondary color LUT 118, the color conversion logic 110 can achieve good visual quality of color conversions. Moreover, by using the cache memory 116 to reference data retrieved from the secondary color LUT 118, and since the secondary color LUT 118 is accessed when the input colors of pixels of an image are changing slowly (such as where the pixel-to-pixel difference is less than a threshold), the color conversion logic 110 can achieve a very high cache hit rate. As a result, delays due to memory accesses are reduced.

In one particular embodiment, the primary color LUT 108 includes a subset of cyan-magenta-yellow-black (CMYK) color values of the secondary color LUT 118. In one particular embodiment, the primary color LUT 108 is stored on-chip, while the secondary color LUT 118 is stored off-chip. By utilizing a cache memory 116 and a smaller primary memory 106, a higher latency, cheaper memory may be utilized to store the secondary color LUT 118, since the cache memory 116 allows for fewer accesses to the secondary color LUT 118. While the secondary color LUT 118 is shown to be separate from the processor 102, in one particular embodiment, the secondary color LUT 118 may be stored in a slower access memory of the processor 102, while the primary color LUT 108 may be stored in a faster access memory of the processor 102.

Figure 2:
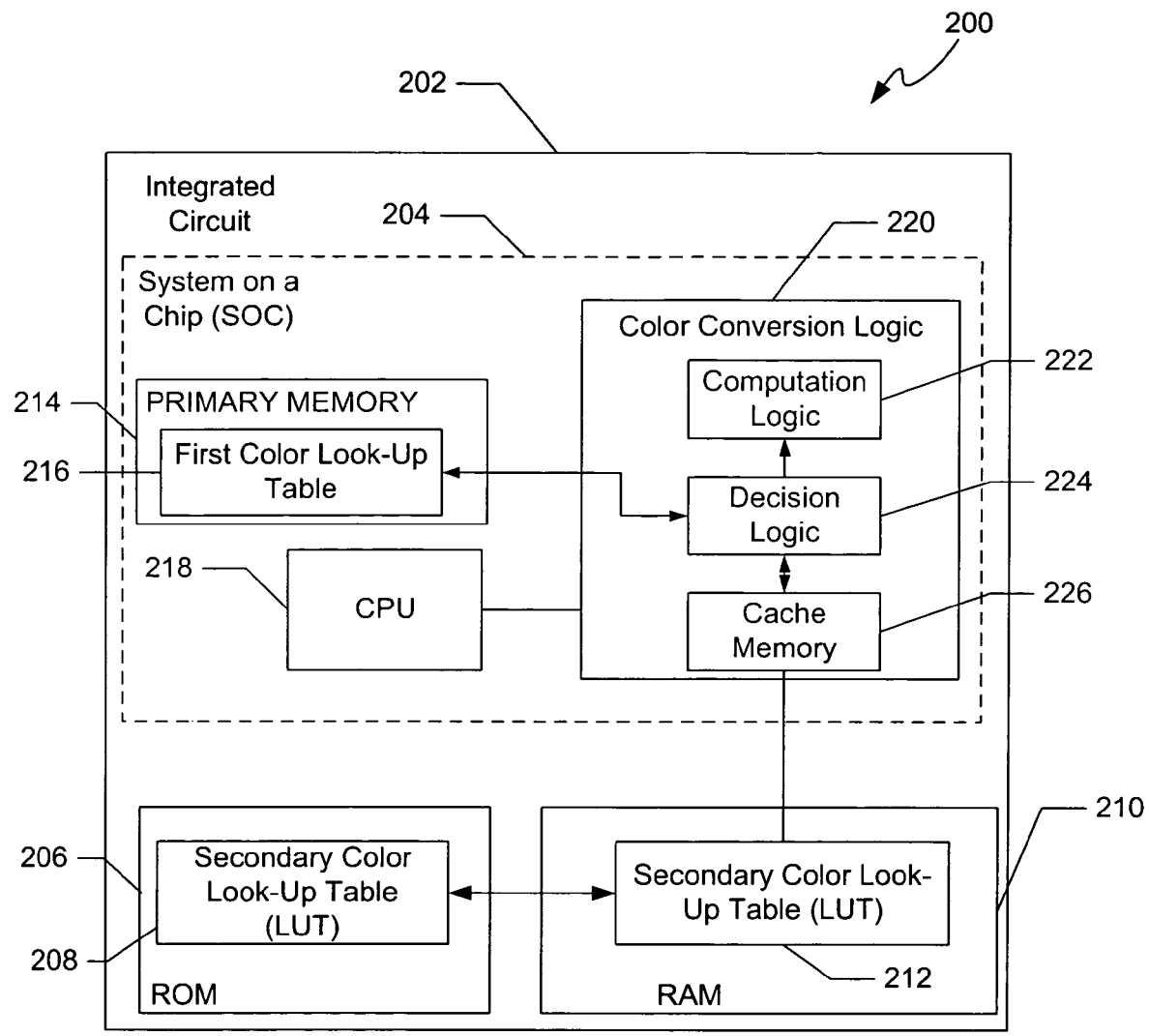
FIG. 2 is a block diagram of another particular embodiment of a representative system for color conversion including a primary memory having a first color conversion table and a secondary memory having a second color conversion table.

FIG. 2 is a block diagram of another particular illustrative embodiment of a representative system 200 for color conversion. The system 200 includes a multi-chip package, which may be referred to as an integrated circuit 202. The integrated circuit 202 includes a system on a chip (SOC) 204, a read-only memory (ROM) 206 with a secondary color look-up table (LUT) 208, and a random access memory (RAM) 210. The RAM 210 may be, for example, a dynamic RAM, a static RAM, or other type of memory. The RAM 210 may store a secondary color LUT 212 derived from the secondary color LUT 208 of the ROM 206.

The SOC 204 may include a primary memory 214 including a first color LUT 216. The SOC 204 may also include a general processor, such as a central processing unit (CPU) 218, to control operations of the SOC 204. Additionally, the SOC 204 may include color conversion logic 220. The color conversion logic 220 may include computation logic 222, decision logic 224, and a cache memory 226.

In one particular embodiment, the secondary color LUT 212 is a 17×17×17 color LUT that includes color values in a second color space. The primary color LUT 216 is a 9×9×9 color LUT that includes color values derived from the color values of the secondary color LUT 212. In one embodiment, the color values of the primary color LUT 216 are sub-sampled from the same color conversion table as the color values of the secondary color LUT 212, but at a lower sampling rate.

In operation, the color conversion logic 220 receives a set of pixels in a first color space to be converted to a second color space. The color conversion logic 220 utilizes computation logic 222 to calculate a difference between a selected pixel and at least one neighboring pixel. The color conversion logic 220 utilizes decision logic 224 to compare the difference to a threshold and to access one of the primary color LUT 216, the cache memory 226, or the secondary color LUT 212 to obtain a set of associated color values in the second color space for each pixel of the set of pixels that are received. The color conversion logic 220 utilizes the computation logic 222 to compute the color value in the second color space based on the set of associated color values for each pixel.

In one particular embodiment, the color conversion logic 222 monitors a ratio of on-chip (on the SOC 204) accesses versus off-chip accesses (to the RAM 210) and adjusts the threshold to bias the decision logic 224 toward on-chip accesses, for example. In general, when a threshold is set at a high level, then the decision logic 224 accesses the secondary color LUT 212 more frequently than when the threshold is set at a lower level.

Figure 3:
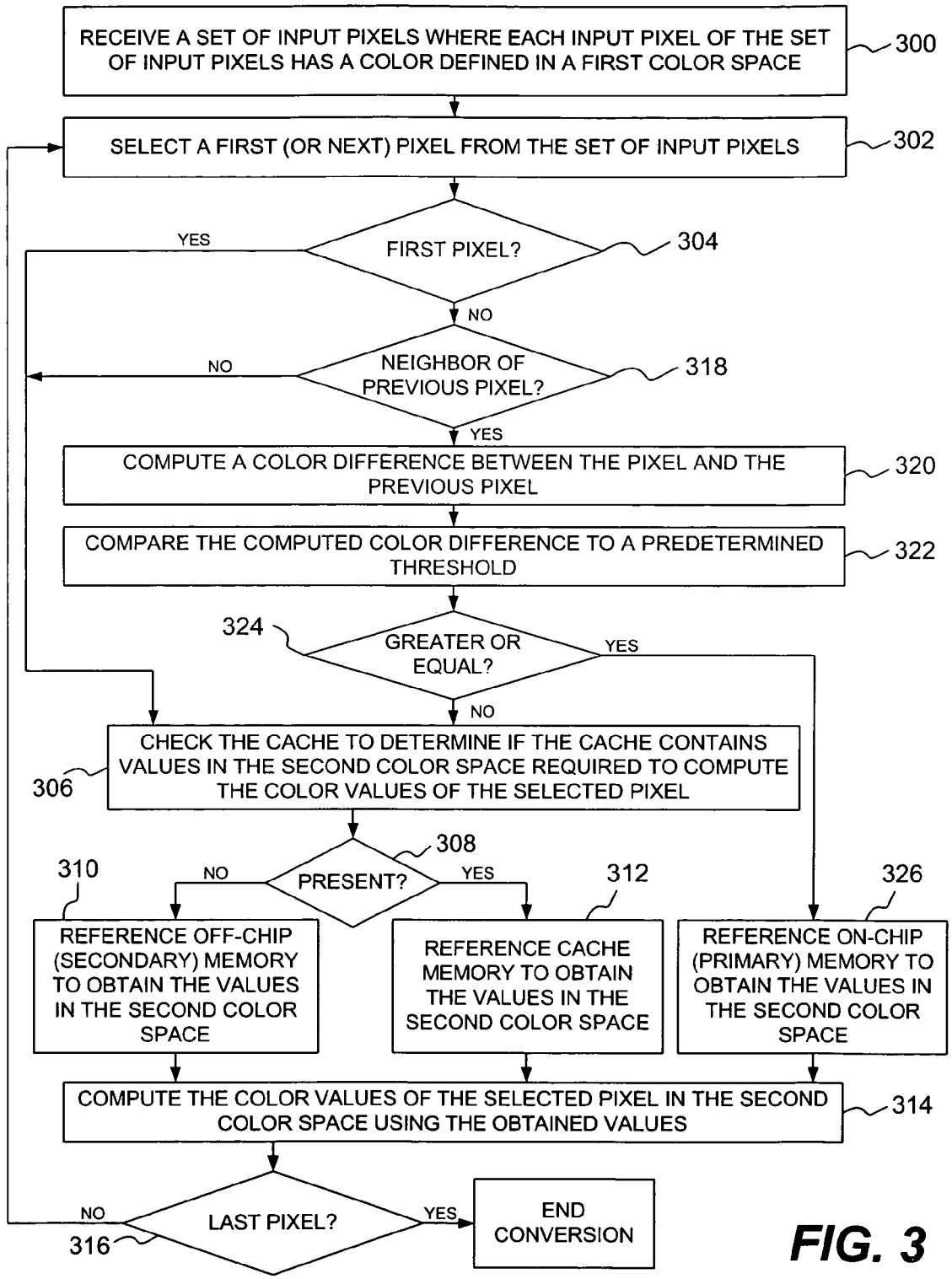
FIG. 3 is a flow chart of a particular illustrative embodiment of a method of color conversion from a first color space to a second color space based on a difference between neighboring pixels relative to a threshold, which may be utilized with the systems of FIGS. 1 and 2.

FIG. 3 is a flow diagram of a particular method of performing color conversion of an image in a first color space to a converted image in a second color space. A set of input pixels (such as an image) is received, where each pixel has a color defined in a first color space (block 300). A first (or next) pixel is selected from the set of input pixels (block 302). If the selected pixel is a first pixel (block 304), the cache is checked to determine if the cache contains values in the second color space required to compute the color value of the selected pixel (block 306). If the color values are not present in the cache (block 308), the off-chip (secondary) memory is referenced to obtain the values in the second color space (block 310). Alternatively, if the color values are present in the cache, the cache memory is referenced to obtain the values in the second color space (block 312). The color value of the selected pixel is computed in the second color space using the obtained values (block 314). The color conversion system checks to see if the selected pixel is the last pixel of the set of pixels (block 316). If the selected pixel is the last pixel, the conversion is ended.

If the selected pixel is not the last pixel (block 316), a next pixel is selected from the set of input pixels (block 302). Since the next pixel is not the first pixel (block 304), the conversion system determines whether the selected pixel is a neighboring pixel of the previously converted pixel (block 318). If the selected pixel is not a neighboring pixel, the cache is checked to determine if the cache contains values in the second color space required to compute the color value of the selected pixel (block 306). If the color values are not present in the cache (block 308), the off-chip (secondary) memory is referenced to obtain the values in the second color space (block 310). Alternatively, if the color values are present in the cache, the cache memory is referenced to obtain the values in the second color space (block 312). The color value of the selected pixel is computed in the second color space using the obtained values (block 314).

If the selected pixel is a neighboring pixel (block 318), a color difference is computed between the selected pixel and the previous pixel (block 320). The computed color difference is compared to a threshold (block 322). If the color difference is greater than or equal to the threshold (block 324), the on-chip primary memory is referenced to obtain the color values in the second color space (block 326). If the color difference is less than the threshold, the cache is checked to determine if the cache contains values in the second color space required to compute the color value of the selected pixel (block 306). If the color values are not present in the cache (block 308), the off-chip (secondary) memory is referenced to obtain the values in the second color space (block 310). Alternatively, if the color values are present in the cache, the cache memory is referenced to obtain the values in the second color space (block 312). The color value of the selected pixel is computed in the second color space using the obtained values (block 314). If the selected pixel is the last pixel (block 316), the conversion is ended. Otherwise, the method advances to block 302 and processes a next pixel until the last pixel is converted.

In general, the threshold may be used to determine both the visual quality of the image resulting from the color space conversion and the frequency with which the cache or secondary memory is accessed. With respect to the visual quality, the threshold defines a granularity of color differences between neighboring pixels. For example, if the threshold is set at a low level, the color value differences between neighboring pixels are likely to exceed the threshold. In this case, the decision logic would access the primary memory to obtain the color values for a majority of the pixels to be converted. The resulting converted image may have lower visual quality, but the conversion process would likely proceed more quickly.

By contrast, if the threshold is set at a high level, the color value differences between neighboring pixels are likely to fall below the threshold. In this case, the decision logic of the processor would access the cache or the secondary memory more frequently, resulting in a higher visual quality of the converted image, perhaps at the expense of increased processing time.

Depending on the particular implementation, software may define the threshold value based on a desired print quality, for example. Alternatively, software may provide a user interface to allow a user to select the threshold. For example, a user may access a printer user interface to configure a print quality setting, such as "draft," "normal," or "high quality." These print quality settings may correspond to threshold values such as a low threshold for draft settings, a mid-level threshold for normal settings, or a high threshold for high quality settings. Thus, a user and/or software may specify a threshold that determines a relative frequency with which the image processor accesses the primary or the secondary color conversion table for any given image.

In general, references to the secondary memory due to a cache miss may result in the cache memory being updated to include referenced values from the LUT within the secondary memory. If the LUT in the secondary memory does not contain a color value that is directly mapped to the color value of a given pixel, the processor may retrieve a set of color values in the second color space from the LUT that correspond to combination of color values in a first color space that approximately match the color values of the selected pixel. The cache memory may be updated with this set of color values, and the processor may interpolate color values for the selected pixel based on the set of color values.

Figure 4:
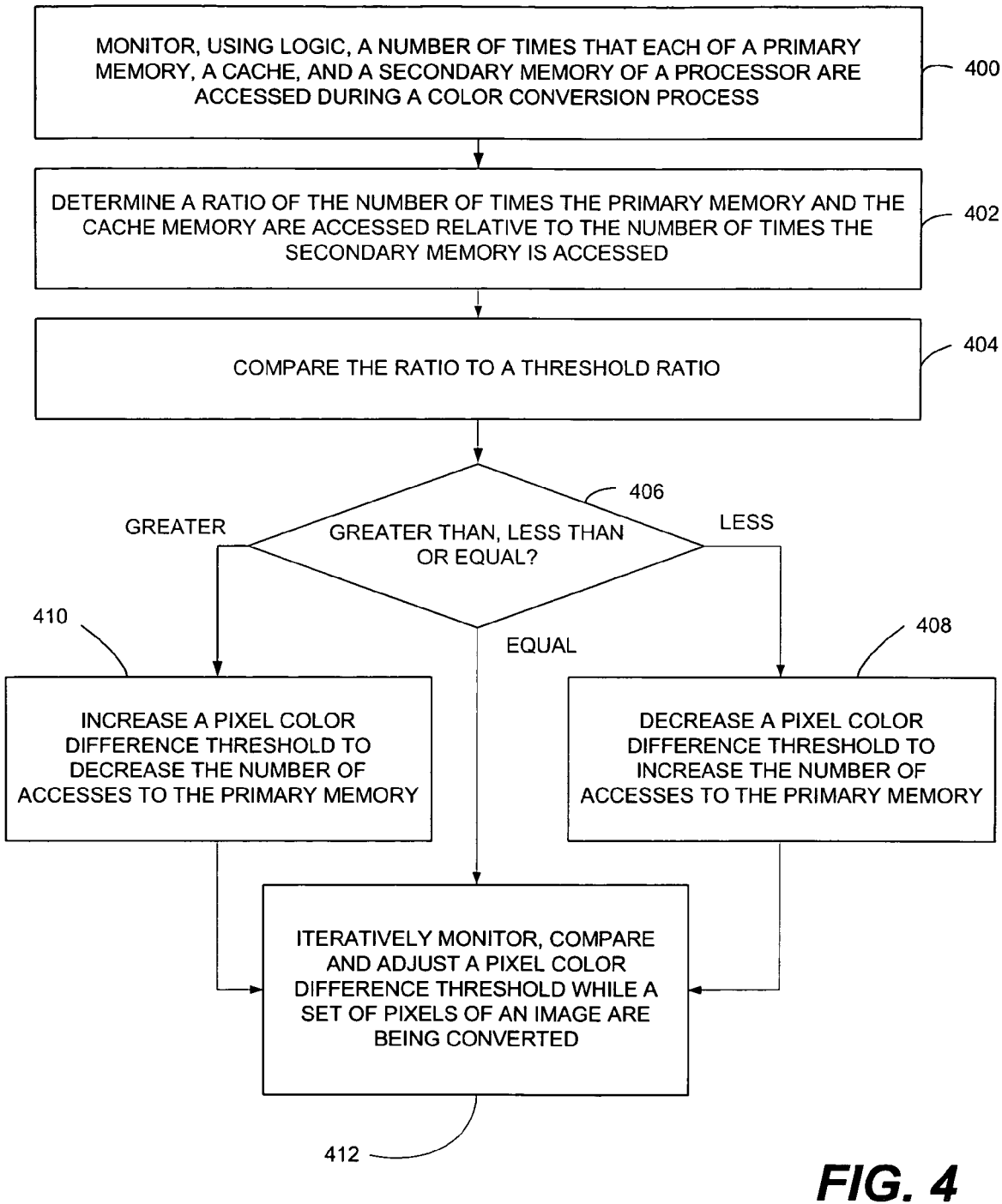
FIG. 4 is a flow chart of a particular illustrative embodiment of a method of adjusting a threshold to tune a processor based on accesses to a primary on-chip color look-up table (LUT) versus accesses to a secondary off-chip LUT that may be utilized with the systems and method of FIGS. 1-3.

FIG. 4 is a flow diagram of a particular illustrative embodiment of a method of dynamically adjusting a threshold to manage the performance of an image processor. A number of times that each of a primary memory, a cache memory, and a secondary memory are accessed is monitored during a color conversion process (block 400). A ratio is determined regarding the number of times the primary memory and the cache memory are accessed relative to the number of times the secondary memory is accessed (block 402). The ratio is compared to a threshold ratio (block 404). If the ratio is not greater than the threshold ratio (block 406), a pixel color difference threshold may be decreased to increase the number of accesses to the primary memory (block 408). If the ratio is greater than the threshold ratio (block 406), the pixel color difference threshold may be increased to decrease the number of accesses to the primary memory (block 410). After increasing the threshold (block 410) or decreasing the threshold (block 408) or if the ratio is equal to the threshold ratio (block 406), the system may iteratively monitor, compare, and adjust the threshold while a set of pixels of an image are being converted (block 412).

In general, it should be appreciated that the processor may dynamically adjust the pixel color difference threshold to tune the processor performance. For example, if a desired tradeoff between color accuracy and processor efficiency is represented by a 50-50 on-chip to off-chip access ratio, the ratio may be monitored at blocks 402 and 404 and adjusted at blocks 408 and 410, as needed, to maintain the desired ratio. More generally, a recent history of on-chip versus off-chip accesses may be monitored, and the threshold may be adjusted to bias the logic toward on-chip accesses when recent history includes more off-chip accesses than is desirable, and vice versa. In one particular embodiment, by fixing or assigning a threshold ratio, the processor may obtain a relatively constant performance.

Figure 5:
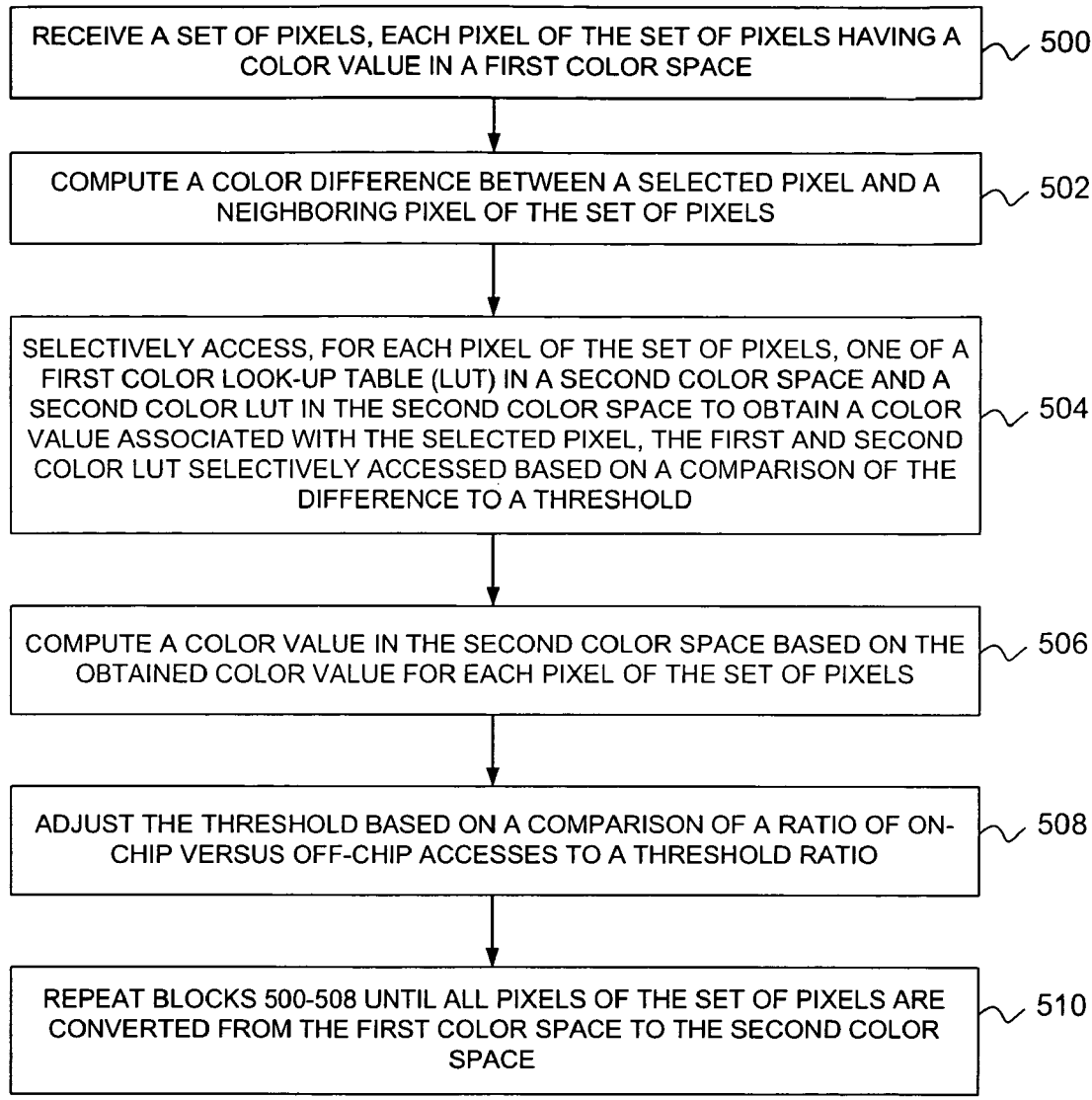
FIG. 5 is a flow diagram of a particular illustrative embodiment of a method of performing a color conversion.

FIG. 5 is an illustrative flow diagram of a representative method of performing a color conversion. A set of pixels is received, where each pixel of the set of pixels includes a color value in a first color space (block 500). A color difference between a selected pixel and a neighboring pixel of the set of pixels is computed (block 502). Either a first color look-up table (LUT) in a second color space or a second color LUT in the second color space is selectively accessed, for each pixel of the set of pixels, to obtain a color value associated with the selected pixel. The first and second color LUT are selectively accessed based on a comparison of the color difference to a threshold (block 504). A color value is computed in the second color space based on the obtained color value for each pixel of the set of pixels (block 506). The threshold is adjusted based on a comparison of a ratio of on-chip versus off-chip accesses relative to a threshold ratio (block 508). Blocks 500 through 508 may be repeated iteratively until each pixel of the set of pixels is converted from the first color space to the second color space (block 510).

It should be appreciated that, in some instances, a particular color LUT may not include a direct mapping of a color value in the first color space to a color value in the second color space. In this instance, a color value may be interpolated from a set of color values in the second color space that correspond to color value combinations in the first color space that closely match the unmapped color value.

It should be appreciated that the above-identified color conversion system and method may be utilized in any device that performs color conversions from one color space to another including, but not limited to, a printer, a display, a personal digital assistant (PDA), a computer, a wireless phone with a display, a data processing device, a video playback device, an MP3 player, a camera, or any combination thereof. Additionally, color conversion using the systems and methods described may be performed to convert pixels from RGB to CMYK, from CMYK to RGB, or from a first color space to a second color space.

In general, a color model describes a way in which colors can be represented as sets of numbers, typically as three or four values or color components. RGB is a color model that has three color components, and CMYK is a color model having four color components. In addition to RGB and CMYK, there are other color models. For example, YIQ (where Y is a luminance value, I is an in-phase value, and Q is a Quadrature value, e.g. a luminance value with two chrominance values) is used in National Television Systems Committee (NTSC) television broadcasts. YUV (where Y is a luminance component, and U and V are chrominance components) is a color space used in phase alternating line (PAL) television broadcast systems, such as those in Europe. Hue-saturation-value (HSV) or hue-saturation-brightness (HSB) is commonly referred to as a color model, but is actually a transformation of an RGB color space. Hugh-saturation-lightness/luminance (HSL) or hue-saturation-intensity (HSI) may also be referred to as color models, but are typically referenced from an RGB color space. Other color models may also exist, which may utilize more than four color components. A color model is typically mapped or referenced to a reference color space to define a footprint or gamut, and the footprint in combination with the color model defines a color space.

It should be understood by a worker skilled in the art that the decision logic and the methods described above with respect to FIGS. 1-5 may be adapted to utilize LUTs corresponding to any color space. The RGB to CMYK conversion discussed above is provided for illustrative purposes only. Other color spaces, including color spaces based on other color models, may also be used.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processor for color space conversion comprising:
    a primary memory of a processor, the primary memory to store a first color look-up table (LUT) related to a second color space; and
    color conversion logic responsive to a received set of pixels, each pixel of the set of pixels having a color value in a first color space, the color conversion logic comprising decision logic to select between the first color LUT and a second color LUT in a secondary memory to obtain at least one color value of the second color space for each pixel of the set of pixels based on a comparison of each pixel to at least one neighboring pixel, wherein the color conversion logic is configured to convert the color value of each pixel from the first color space to the selectively obtained at least one color value of the second color space.

2. The processor of claim 1, wherein the color conversion logic further comprises:
    computation logic to compute a difference between a first pixel and a neighboring pixel; and decision logic to compare the difference to a threshold, the decision logic to access the first color LUT when the difference is greater than or equal to the threshold and to access the second color LUT when the difference is less than the threshold.

3. The processor of claim 1, wherein the color conversion logic further comprises a cache memory to store a range of color values obtained from the second color LUT when the second color LUT is accessed.

4. The processor of claim 1, wherein the decision logic selectively accesses the second color LUT when a color value difference between a selected pixel and a neighboring pixel is less than a threshold.

5. The processor of claim 4, wherein the threshold is defined by printer driver software based on a print quality.

6. The processor of claim 4, wherein the threshold varies over time.

7. The processor of claim 4, wherein the color conversion logic monitors accesses of the first color LUT and the second color LUT and adjusts the threshold to tune a performance parameter.

8. The processor of claim 1, wherein the primary memory and the color conversion logic are fabricated on an integrated circuit.

9. The processor of claim 1, wherein the first color LUT and the second color LUT are programmed with the same color conversion table, but sampled at different rates.

10. processor of claim 1, wherein an access time of the primary memory is less than an access time of the secondary memory.

11. The processor of claim 1, wherein the primary memory is located on a first device including the decision logic, and wherein the secondary memory is located on a second device coupled to the first device.

12. The processor of claim 1, wherein the first color space comprises a set of red-blue-green (RGB) color values and the second color space comprises a set of cyan-magenta-yellow-black (CMYK) color values.

13. A method for color space conversion comprising:
receiving a set of pixels, each pixel of the set of pixels having color values in a first color space;
computing a color difference between a selected pixel and a neighboring pixel of the set of pixels;
selectively accessing one of a first color look-up table (LUT) in a second color space and a second color LUT in the second color space to obtain color values associated with the selected pixel in the second color space, the first and second color LUTs selectively accessed based on a comparison of the color difference to a threshold; and
converting each pixel from the first color space to the second color space by computing color values in the second color space based on the obtained color values.

14. The method of claim 13, wherein selectively accessing comprises:
selectively accessing the first color LUT when the color difference is greater than or equal to the threshold.

15. The method of claim 13, wherein selectively accessing comprises:
selectively accessing the second color LUT when the color difference is less than or equal to the threshold.

16. The method of claim 13, further comprising:
monitoring a number of accesses of the first color LUT and of the second color LUT; and
adjusting the threshold to tune a performance parameter.

17. The method of claim 13, wherein after the second color LUT is accessed, the method further comprises: storing a set of color values from the second color LUT in a cache memory.

18. The method of claim 17, wherein selectively accessing further comprises:
comparing the color difference to the threshold;
accessing the first color LUT to obtain the associated color value when the color difference is greater than the threshold;
accessing the cache memory to obtain the associated color value when the color difference is less than the threshold and the color value is within the set of color values in the cache memory; and
accessing the second color LUT to obtain the associated color value when the color difference is less than the threshold and the color value is not within the set of color values in the cache memory.

19. The method of claim 13, wherein the first color LUT is stored in an on-chip memory and the second color LUT is stored in an external memory.

20. The method of claim 13, wherein the first color LUT and the second color LUT are programmed from a common color conversion table at different sampling rates.

21. The method of claim 13, wherein computing the color value comprises:
interpolating color values in the second color space for the selected pixel from color values in the second color space that correspond to combinations of color values in the first color space that approximately match the color values of the selected pixel.

22. A color space conversion system comprising:
means to receive a set of pixels, each pixel of the set of pixels having a color value in a first color space;
means to compute a color difference between a selected pixel and a neighboring pixel of the set of pixels;
means to selectively access, for each pixel of the set of pixels, one of a first color look-up table (LUT) in a second color space and a second color LUT in the second color space to obtain a color value in the second color space associated with the selected pixel, the first and second color LUTs selectively accessed based on a comparison of the color difference to a threshold; and
means to convert each pixel from the first color space to the second color space based on the obtained color values.

* * * * *

UNITED STATES PATENT AND TRADEMARK OFFICE
CERTIFICATE OF CORRECTION

PATENT NO. : 7,586,644 B2  Page 1 of 1
APPLICATION NO. : 11/512905
DATED : September 8, 2009
INVENTOR(S) : Walton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Twenty-first Day of September, 2010

David J. Kappos
*Director of the United States Patent and Trademark Office*